(12) United States Patent
Walsh et al.

(10) Patent No.: US 6,764,625 B2
(45) Date of Patent: Jul. 20, 2004

(54) METHOD OF PRODUCING CORE COMPONENT, AND PRODUCT THEREOF

(75) Inventors: John Peter Walsh, St. Charles, IL (US); Geoffrey Brian Hardwick, West Chicago, IL (US); Allen Ray Hill, Laurel, MS (US)

(73) Assignee: Masonite Corporation, Tampa, FL (US)

( * ) Notice: Subject to any disclaimer, the term of this patent is extended or adjusted under 35 U.S.C. 154(b) by 227 days.

(21) Appl. No.: 10/091,725

(22) Filed: Mar. 6, 2002

(65) Prior Publication Data

US 2003/0168769 A1 Sep. 11, 2003

(51) Int. Cl.⁷ ................................................. B27N 5/00
(52) U.S. Cl. ...................................... 264/119; 264/109
(58) Field of Search .................................. 264/109, 119

(56) References Cited

U.S. PATENT DOCUMENTS

| | | |
|---|---|---|
| 670,939 A | 4/1901 | Rapp |
| 877,922 A | 2/1908 | Gager |
| 937,430 A | 10/1909 | Evans, Jr. |
| 1,183,842 A | 5/1916 | Alling |
| 2,511,620 A | 6/1950 | Clements ........................ 20/91 |
| 2,797,452 A | 7/1957 | Ropella ......................... 20/35 |
| RE24,558 E | 10/1958 | Tyree ........................... 189/46 |
| 3,287,855 A | 11/1966 | Hallonquist et al. ........... 49/503 |
| 3,385,002 A | 5/1968 | Quinif .......................... 49/501 |
| 3,525,663 A | 8/1970 | Hale ............................ 161/68 |
| 3,527,664 A | 9/1970 | Hale ............................ 161/68 |
| 3,597,891 A | 8/1971 | Martin ......................... 52/145 |
| 3,793,125 A | 2/1974 | Kunz .......................... 156/62.2 |
| 3,834,487 A | 9/1974 | Hale ............................ 181/33 |
| 3,899,860 A | 8/1975 | Newell ......................... 52/313 |
| 3,938,963 A | 2/1976 | Hale ........................... 29/191.4 |
| 4,104,828 A | 8/1978 | Naslund et al. ................ 49/399 |
| 4,142,007 A | 2/1979 | Lampe et al. ................. 428/165 |
| 4,148,857 A | 4/1979 | Wheeler ........................ 264/87 |
| 4,175,150 A | 11/1979 | Luck et al. ................... 428/171 |
| 4,238,438 A | * 12/1980 | Laughinghouse et al. ..... 264/119 |
| 4,248,163 A | 2/1981 | Caughey ...................... 108/53.3 |
| 4,265,067 A | 5/1981 | Palmer ........................ 52/309.9 |
| 4,305,989 A | 12/1981 | Luck et al. |
| 4,393,019 A | 7/1983 | Geimer ......................... 264/83 |
| 4,583,338 A | 4/1986 | Sewell et al. .................. 52/456 |
| 4,630,420 A | 12/1986 | Hagemeyer ................... 52/313 |
| 4,706,431 A | 11/1987 | Corvese ........................ 52/313 |

(List continued on next page.)

FOREIGN PATENT DOCUMENTS

DE        199 57 610 A    *   5/2001

OTHER PUBLICATIONS

AU–B–17710/92, Patent Abridgment, Australian Patent Office, Accept. No. 648174.
"Modern Particle board" Dry Process Fiberboard Manufacturing, Maloney, 1977.

*Primary Examiner*—Mary Lynn Theisen
(74) *Attorney, Agent, or Firm*—Liniak, Berenato & White, LLC (57) ABSTRACT

A core component is molded to include surface depressions to compensate for varying widths and depths of the shell or framing of a building or structural member. The component includes two major surfaces defining respective front and rear sides of the component, and the rear side of the component is preferably the mirror image of the front side. The core component is preferably pre-formed and the surface layers are wetted to contain at least 2%, preferably about 4% to 20%, more moisture than at the thickness center of the mat to provide surfaces capable of adhesive coating for adherence to surrounding structural members, preferably two prefabricated molded doorskins. The core component is preferably made from a composite soft board material.

32 Claims, 6 Drawing Sheets

U.S. PATENT DOCUMENTS

| | | | |
|---|---|---|---|
| 4,811,538 A | 3/1989 | Lehnert et al. | 52/455 |
| 4,853,062 A | 8/1989 | Gartland | 156/219 |
| 4,896,471 A | 1/1990 | Turner | 52/455 |
| 4,922,660 A | 5/1990 | Omelchuk | 49/395 |
| 4,935,281 A | 6/1990 | Tolbert et al. | 428/116 |
| 4,937,024 A | 6/1990 | Hickson | 264/83 |
| 5,008,057 A * | 4/1991 | Risius et al. | 264/134 |
| 5,091,458 A | 2/1992 | Santoemma | 524/436 |
| 5,142,835 A | 9/1992 | Mrocca | 52/309.12 |
| 5,167,105 A | 12/1992 | Isban et al. | 52/455 |
| 5,217,665 A | 6/1993 | Lim et al. | 264/83 |
| 5,219,634 A | 6/1993 | Aufderhaar | 428/156 |
| 5,242,735 A | 9/1993 | Blankenburg et al. | 428/116 |
| 5,262,217 A | 11/1993 | Blaauw | 428/49 |
| 5,264,062 A | 11/1993 | Ohsumi et al. | 156/228 |
| 5,266,379 A | 11/1993 | Schaeffer et al. | 428/178 |
| 5,397,406 A | 3/1995 | Vaders et al. | 156/64 |
| 5,439,749 A | 8/1995 | Klasell et al. | 428/537.1 |
| 5,470,631 A | 11/1995 | Lindquist et al. | 428/105 |
| 5,887,402 A * | 3/1999 | Ruggie et al. | 52/455 |
| 6,132,656 A | 10/2000 | Dodd | 264/83 |

\* cited by examiner

FIG. 8

METHOD OF PRODUCING CORE COMPONENT, AND PRODUCT THEREOF

BACKGROUND OF THE INVENTION

1. Field of the Invention

The invention relates generally to the production of man-made composite structural and building products molded from a mat of cellulosic fibers produced by the dry process and molded to include one or more interior depressions. More particularly, the invention relates to the production of a cellulosic core component molded to include one or more interior depressions which can be utilized, for example, in an interior space or void formed by a shell or framework of a building product, particularly as a core component that is adhered between opposed doorskins, said core component having one or more interior depressions shaped to receive depressions molded into the doorskins.

2. Brief Description of Related Technology

The invention is described herein is an improvement over the method and articles described in this Assignee's U.S. Pat. No. 5,887,402 ('402). The '402 patent describes a method of manufacturing a core component and then post-press machining or routing one or more interior depressions into at least over major surface of the core component to accommodate interior depressions in the adhered doorskins. In accordance with the present invention, core components are manufactured to include the required interior depressions in the pressing operation to eliminate or substantially reduce any post-press machining.

Man-made boards, such as fiberboard, can be embossed or molded to have three-dimensional shapes and various design and structural features found in natural wood. Types of useful man—man boards are referred to by the following terms, for example: (a) fiberboards such as hardboard (e.g., low-density hardboard), soft board, and medium-density fiberboard and (b) chipboards such as particleboard, medium-density particleboard, and oriented strandboard ("OSB"). Composites of these boards are also useful. Such boards, particularly hardboard, have found widespread use in the manufacture of doorskins, which can be glued together or laminated to form a shell which supports or encloses a structure or a frame.

Commonly, doorskins (also referred to as door faces) are molded from a planar cellulosic mat to include one or more interior depressions or contours, such as one or more square or rectangular depressions which do not extend to the outer edge or periphery of the doorskin product. Doorskins often require inclined molded walls having a plurality of contours that include varied curved and planar surfaces. Where the depressions or contours are included on a doorskin product, this can serve to replicate a more expensive natural wood paneled door. For example, doors having two, three, four, five, and six panel designs are commonly produced. The exterior or visible surfaces of the fiberboard also can be embossed with a design that represents a wood grain pattern found in a natural piece of wood.

The principal processes for the manufacture of wood composites such as doorskins and other structural or building products include (a) wet felted/wet pressed or "wet" processes, (b) dry felted/dry pressed or "dry" processes, and (C) wet felted/dry pressed or "wet-dry" processes. The core components of the present invention are manufactured by the dry process.

In the dry process of the present invention, the cellulosic fibers are generally conveyed in a gaseous stream or by mechanical means rather than a liquid stream. For example, the cellulosic fibers may be first coated with a thermosetting resin binder, such as a phenol-formaldehyde resin. The fibers are then randomly formed into a mat by air blowing the resin-coated fibers onto a support member. The mat may optionally be subjected to pre-press drying. The mat, typically having a moisture content of less than about thirty weight percent and preferably less than about ten weight percent, is then pressed under heat and pressure to cure the thermosetting resin and to compress the mat into an integral consolidated structure.

The fiber mats that are made by the dry process do not have as much fiber intertangling of fibrillated fibers as mats made by the wet or wet/dry processes since the dry process fibers are not slurried in water during water drainage, which enhances fiber intermingling and entangling, and are coated with resin prior to substantial fiber intermingling. As a result, dry process mats that are consolidated by heat and pressure are not as strong as wet or wet/dry process consolidated mats and have been found to suffer from surface peeling when relatively thick dry process core components, e.g., one half inch thickness or more, are roll-coated with adhesive for adherence to opposed doorskins.

Fiber mats have been pressed into pre-selected decorative shapes, typically at a thickness of about one-eighth of an inch, to include one or more panels or depressions and/or other contours in the formation of doorskins, as described above. Two doorskin pieces are typically joined together with an adhesive binder, which is placed at least at the contact points along the periphery of the door assembly formed by the doorskins. Because the doorskin pieces are contoured to include one or more depressions surrounded by co-planar stiles and rails, an open, interior space of varying dimensions is formed by the doorskin assembly.

Doorskin pieces are often not used alone, but in conjunction with (surrounding) some other material(s) disposed on an interior space disposed between two opposed doorskins to add support to the final door product. The doorskin pieces often utilize wood framing at or near the perimeter of the assembled doorskin. It is known to use rails and stiles, which, when attached together, can provide additional structural support for the door. Rails can be generally described as horizontally-oriented beams which provide support for the door. Stiles, on the other hand, can be generally described as longitudinal or vertically-oriented beams which provide support for the door. In addition, a lock block is optionally utilized to provide further support for a door handle and/or a locking mechanism (e.g., a so-called "dead bolt") at the periphery of the door. The lock block is preferably secured to a stile and/or a rail.

However, although the structure of a man-made composite door product is supported with rails and stiles, often the door still will not perform as well as a natural solid wood door because the interior spaces defined by the opposed doorskins will be substantially hollow or empty. The hollow spaces or voids cause the door to be lighter than is generally preferred. Further, it is often found that the sound insulation provided by such doors may not be satisfactory. Thus, it is often desirable to use a core material (e.g., core pieces or components) to fill these hollow spaces.

A suitable core material should also provide the door product with a desirable weight, for example the weight of a similarly-styled natural solid wood door. A typical, thirty-inch wide solid pine door weighs approximately forty-two pounds. Known core materials and components have the disadvantage, for example, that they often fall far short of the desired weight. In addition, some alternatives to doorskins having a core material (e.g., full thickness particleboard doors) produce a door that is too heavy and/or difficult to manufacture. In addition, a core material should provide the door with a relatively even weight distribution.

The core material should also have characteristics (e.g., size and shape) that allow placement and attachment within the interior spaces formed by the doorskin assembly with very close tolerances required to match the dimensions of the stiles and rails. As described above, doorskins, particularly for paneled doors, are commonly molded to include one or more interior depressions (i.e., on the surface at some distance from the periphery), such as one or more square or rectangular depressions that do not extend to an outer edge of the doorskin. These surface depressions create varying depths (measured from the front face to the back face of the door) of the interior void formed by a pair of assembled doorskins. When placing a core material or component on the interior of the doorskin assembly, it is therefore necessary to compensate for the varying depth of the interior void.

In the past, core materials made of corrugated cardboard and/or paper have been used. However, it has been found that sometimes the sound insulation provided by doors using such core materials may not be satisfactory. This Assignee's U.S. Pat. No. 5,887,402 describes contoured core components made from wood fibers which solved many of the problems associated with the void space, or resulting from inadequate core materials, that existed prior to the '402 invention. However, in accordance with the '402 patent, time- and labor-intensive post-press machining or routing of the major surfaces of the core components to accommodate depressions formed in adhered doorskins. This process of machining or routing depressions into major surfaces of the core components has caused major plant dusting problems and has caused the final door product to be too expensive, substantially reducing the commercial success of the composite core component embodiment wherein the core components are disposed between spaced doorskins.

In accordance with the present invention, a variety of manufacturing problems have been overcome in the manufacture of core components since the '402 invention, particularly in processing depressions into the core material and in pressing the fibrous mat to form core components having consistent caliper measurements, in a unitary, non-laminated structure, to match the caliper of core component-adjoining stiles and rails, to allow for the manufacture of core components that include interior depressions formed directly in the core components in the consolidation press in order to eliminate or substantially reduce post-press surface-forming steps, such as machining, while providing core material depressions contoured to receive the adjacent doorskin depressions.

SUMMARY OF THE INVENTION

It is an object of the invention to overcome one or more of the problems described above, in the manufacture of wood-fiber, contoured core components for any use described herein, particularly for core components disposed between spaced doorskins.

Accordingly, the methods and articles described herein provide a core component that can provide various beneficial properties to various building components, such as doors. The core component is a contoured article having two major exterior surfaces defining respective front and rear sides thereof. There is at least one molded depression or contour in at least one, and preferably both major planar surfaces, wherein the rear side of each core component is preferably molded to be the mirror image of the front side. In one embodiment, the depressions each include (a) first and second inclined depression walls extending downwardly from the major plane and (b) a depression bottom extending between the inclined depression walls.

According to a preferred embodiment, a door core component is adapted, by molding, for placement on the interior of (sandwiched between) a pair of doorskins defining a core component-receiving interior space or void, so as to provide a composite door with various improved characteristics, including, for example, beneficial weight, strength (e.g., rigidity), sound insulation, and fire insulation properties. The preferred core components are made of a composite soft board material, having a specific gravity less than about 0.4, compressed from a dry process mat having a basis weight of about 0.9 lb./ft$^2$ to about 3.0 lb./ft$^2$ after wetting at least one, and preferably both major surfaces of the mat to contain an average of at least 2% by weight more moisture in wetted major surface layer(s), when placed into the mold cavity, than the average moisture content at the center of the thickness of the mat, based on the dry weight of the mat. Said surface layers are hereby defined to consist of 10% of the thickness of the mat when placed in the mold cavity, measured from, and perpendicular to, the wetted surface.

The methods and articles described herein also provide a rigid building or structural member having one or more interior spaces or voids, such as a door product, utilizing the inventive core component. The shell or exterior of the building member, e.g., doorskins, as well as the core component, are preferably made of a composite cellulosic material containing at least 80%, preferably at least 85%, cellulosic fibers refined from wood, e.g., wood chips. The core component can be secured on the interior of the building member with an adhesive. The invention also provides a process of producing such a building member by the dry process, in a method that is improved over that described in U.S. Pat. No. 5,887,402.

In one embodiment, the core component includes a feature wherein a single design of core component can be utilized in various styles of building member shells. This feature includes providing contours or depressions to the core component, such that a core component having a single design can fit into the hollow spaces or voids found, for example, in multiple styles of paneled (e.g. six-paneled) and/or contoured doors.

Further objects, aspects and advantages of the methods and articles described herein will be apparent to those skilled in the art from the following detailed description, taken in conjunction with the drawings and the appended claims.

DETAILED DESCRIPTION OF THE PREFERRED EMBODIMENTS

In accordance with the methods and articles described herein, a core component or insert is provided that can be placed in interior voids or spaces formed by structural or building members such as doors, so as to provide beneficial characteristics thereto.

As used herein, the term "building or structural member" includes any building article that contains a void or space on an interior thereof and with which it is desirable to include a core component. For example, it can be desirable to place a core component in the interior voids of any of the following materials that have, or are formed or shaped to include, one or more interior depressions on at least one major surface: various types of interior wall members or sections, exterior wall members or sections, partition members or sections, furniture components, decorative wall hangings, including under chair rail, vehicle components, packaging components, and many types of doors. It is not necessary that the structural member be completely enclosed around its entire perimeter in order to create a void, as the term is used herein. The inventive core component can be useful with a structural member which has a void exposed to the atmosphere, but which void will not be visible in the final product. In other words, a box lacking one or more of its sides can still define a void. The core component can also act as a backing or enclosing member for a structural member.

The core components described herein are preferably used in conjunction with the manufacture of a door product, and more preferably in the manufacture of a door product including composite doorskins made of fiberboard or another man-made board material. As described above, such doorskins are commonly molded from a cellulosic mat having two major planar surfaces that are molded to include one or more interior depressions along one major surface of the article, molded such that the depression extends beyond the opposed major surface, such as one or more square, rectangular, and/or curved depressions that do not extend to an outer edge of the article, in a thickness of about ⅛ inch. The core component of the invention can compensate for the varying depth of the interior void, caused by the depressions in the doorskin, by consolidating the core component to include one or more interior depressions shaped complementary to the depressions formed in the molded doorskins, and capable of receiving the depressions while providing structural integrity to the door product. In accordance with an important feature of the methods of manufacturing the core components described herein, the core components are molded to include one or more interior depressions to receive the doorskin depressions, while maintaining constant caliper to the planar surfaces surrounding the core material depressions and, importantly, to provide higher density, stronger planar surfaces sufficiently strong for adhesive coating applications without causing surface defects, such as surface peeling, in the core components.

The core component is a pre-consolidated or pre-formed cellulosic article that aids in providing beneficial properties to the doorskin or other building member. The core component includes one or more contoured depressions that are shaped in a heated press to receive depressions formed in man-made composite doorskins, such that the doorskins can be adhesively secured to the core component at the coplanar doorskin-contacting planar areas surrounding the core component depressions.

Various embodiments of the methods and articles described herein are detailed below with reference to the drawings. Initially referring to FIG. 1, there is illustrated a door, generally designated 10, which includes a front doorskin 11 and an identical, rear doorskin 11a, secured to opposite major planar surfaces of a door frame or interior support structure or framing member 20. (Only the side edge of the rear doorskin 11a is visible in FIG. 1.) The framing member 20, known as a stile, can be made of natural wood, man-made pressed wood, or any other suitable material. The doorskins 11 and 11a are preferably molded so as to impart aesthetic surface contours in the visible outer surfaces that correspond to essentially identical contours of a mold cavity (not shown). The doorskins 11 and 11a are preferably secured, e.g., with an adhesive, to both major surfaces of a core component in accordance with the invention, preferably by applying adhesive to planar surfaces of the core component.

The doorskins shown in the drawings are molded to simulate multi-panel door surfaces. The embodiment shown in FIG. 1 contains two molded depressions 12 and 13 (having curved portions 14, 15, and 16) that define and surround two panels 17 and 18, respectively. The panels 17 and 18 are preferably coplanar. Each of the depressions 12 and 13 is completely surrounded by a substantially planar (e.g., horizontal) door surface portion 19. Preferably, the panels 17 and 18 lie in the same plane as the door surface portion 19; however, this need not be the case.

Figure 1:
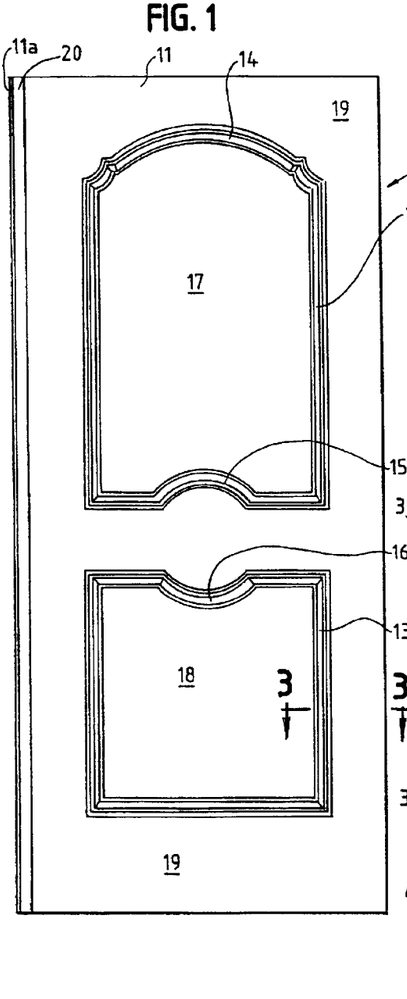
FIG. 1 is an elevated perspective view of an embodiment of a two-panel door in accordance with the methods and articles described herein.
Figure 2:
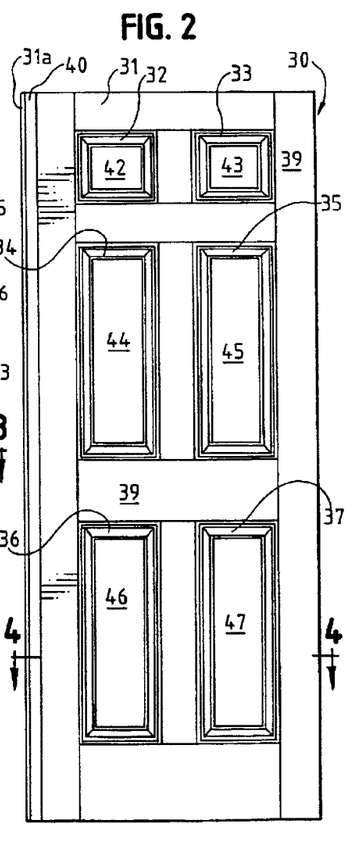
FIG. 2 is an elevated perspective view of an embodiment of a six-panel door in accordance with the methods and articles described herein.

FIG. 2 illustrates a simulated six-panel door 30. Similar to the two-panel door illustrated in FIG. 1, the door 30 has a front doorskin 31 and a rear doorskin 31a supported by a framing member 40 (e.g., a stile). The doorskin 31a can be identical to the doorskin 31. The door 30 has six depressions 32, 33, 34, 35, 36, and 37 that are rectangular in shape. The rectangular depressions completely surround six simulated horizontal door panels 42, 43, 44, 45, 46, and 47, respectively. Each of the depressions 32–37 is completely surrounded by a substantially planar (e.g., vertical) door surface portion 39. The panels 42–47 can lie in the same plane as the surface portion 39. Optionally, the door panels 42–47 can lie in a plane different from the plane of the portion 39. Nevertheless, the surfaces 39 and 42–47 can be referred to generally as the major planar surface of the doorskin 31.

In the two-panel door shown in FIG. 1, the depressions each have a rectangular shape that has been altered with the curved portions 14, 15, and 16. Otherwise, the door of FIG. 1 has characteristics similar to the six-panel door shown in FIG. 2.

Figure 3:
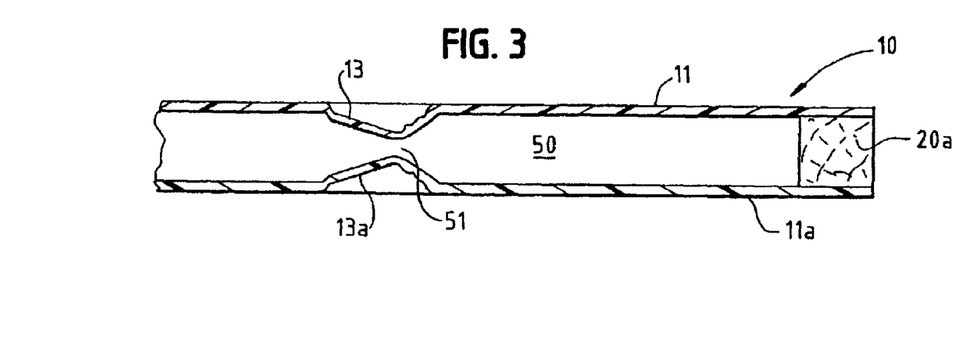
FIG. 3 is a cross-sectional view taken along line 3—3 of FIG. 1 illustrating the details of the concave and convex curves in the faces of the door.

Referring now to FIG. 3, there is illustrated a cross-sectional view of the door of FIG. 1 taken along line 3—3 of FIG. 1. This drawing illustrates some of the details of the curvatures in the faces 11 and 11a of the door 10 of FIG. 1. As described above, the doorskins 11, 11a are attached to a stile 20a which is parallel to the stile 20 of FIG. 1. As shown in FIG. 3, the doorskins 11 and 11a define an interior space or void 50 therebetween.

In FIG. 3, the depression 13, along with a depression 13a on the rear doorskin 11a, causes the void 50 to have a narrower depth (measured from a point on doorskin 11 along a line perpendicular to the doorskin 11 to a point on doorskin 11a) than the depth at other locations of the door of FIG. 3. This location is referred to herein as a constriction 51. One embodiment of the invention provides a one-piece, unitary (non-laminated) core component in the void 50 that can provide sufficient weight properties and sound insulation properties to the final product, while compensating for the constriction 51 at the location of depressions 13 and 13a, for example, when removed from the press, without substantial machining or routing being necessary, machining and/or routing usually being completely unnecessary.

Figure 4:
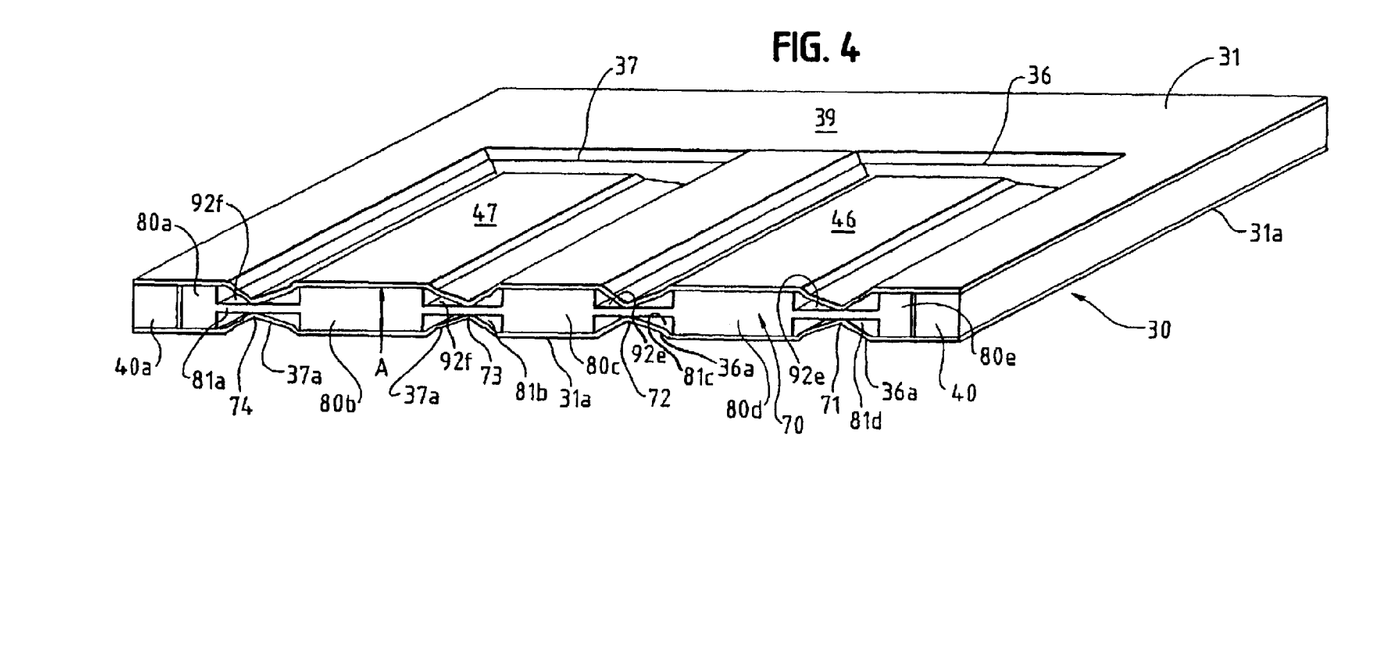
FIG. 4 is a cross-sectional view taken along line 4—4 of FIG. 2 of a paneled composite door, having perimeter framing and a door core component in accordance with the methods and articles described herein.

FIG. 4 illustrates a cross-section through a line 4—4 of the paneled door 30 of FIG. 2. As described above, the paneled door 30 includes the doorskins 31 and 31a. The door 30 includes the stiles 40 and 40a and a door core component, generally designated 70. Shown in FIG. 4 are the contoured depressions 36 and 37 that define and surround the raised panels 46 and 47, respectively. The bottom doorskin 31a has contoured depressions 36a and 37a. As with the door portion shown in FIG. 3, the depressions 36 and 36a define constrictions 71 and 72 at the locations indicated in FIG. 4. Similarly, the depressions 37 and 37a define constrictions 73 and 74 at the indicated locations.

As shown in FIG. 4, the core component 70 includes five portions 80a, 80b, 80c, 80d, and 80e, which are relatively deeper than intermediate segments 81a, 81b, 81c, and 81d (i.e., the portions 80 have a greater dimension measured from opposite major surfaces in contact with interior planar surfaces of the doorskins 31 and 31a). The relatively thin or narrow segments 81 allow the core component 70 to continuously extend through, and fit into, the constrictions 71–74. Thus, one advantage of the methods and articles described herein is that it provides a single, pre-consolidated article that can be placed on the interior of a doorskin, when removed from the press, without substantial machining or routing or other post-press surface forming being necessary.

The portions 80 of the core component 70 have a depth measured by a perpendicular line segment from one exterior surface (not shown in FIG. 4) of the portion 80 in contact with an interior surface of doorskin 31 to the opposite exterior surface of the portion 80 in contact with an interior surface of doorskin 31a. (Such a measurement can be made along the line segment "A" in FIG. 4.) This depth can be, for example, in the range of about ¾ inch to about 6 inches, preferably about 1 to 4 inches, more preferably about 1 to about 2 inches, most preferably about 1⅛ inches to about 1¾ inches, e.g., particularly about 1⅜ inches or 1½ inches. The relatively thin segments 81 can each have a depth, for example, in the range of about ⅛ to about ½ inch, e.g., about ⅜ inch (measured along lines parallel to the line segment "A" in FIG. 4). The segments 81 preferably intersect with the portions 80 so that the depth differential therebetween is equally divided above and below the segments 81, as shown in FIG. 4. In the embodiment of FIG. 4, the segments 80 and 81 intersect at an angle of about ninety degrees. However, these measurements are variable depending, for example, upon (a) the type of product in which the core component 70 is used, (b) the type of material used to make the core component 70, and (c) the weight and sound insulation properties which are desired in the final product. However, it is highly preferred that at least the planar exterior surface portions 80 of the core are in substantially continuous contact with (e.g., secured to) the interior planar surfaces of the doorskins 31 and 31a.

Figure 5:
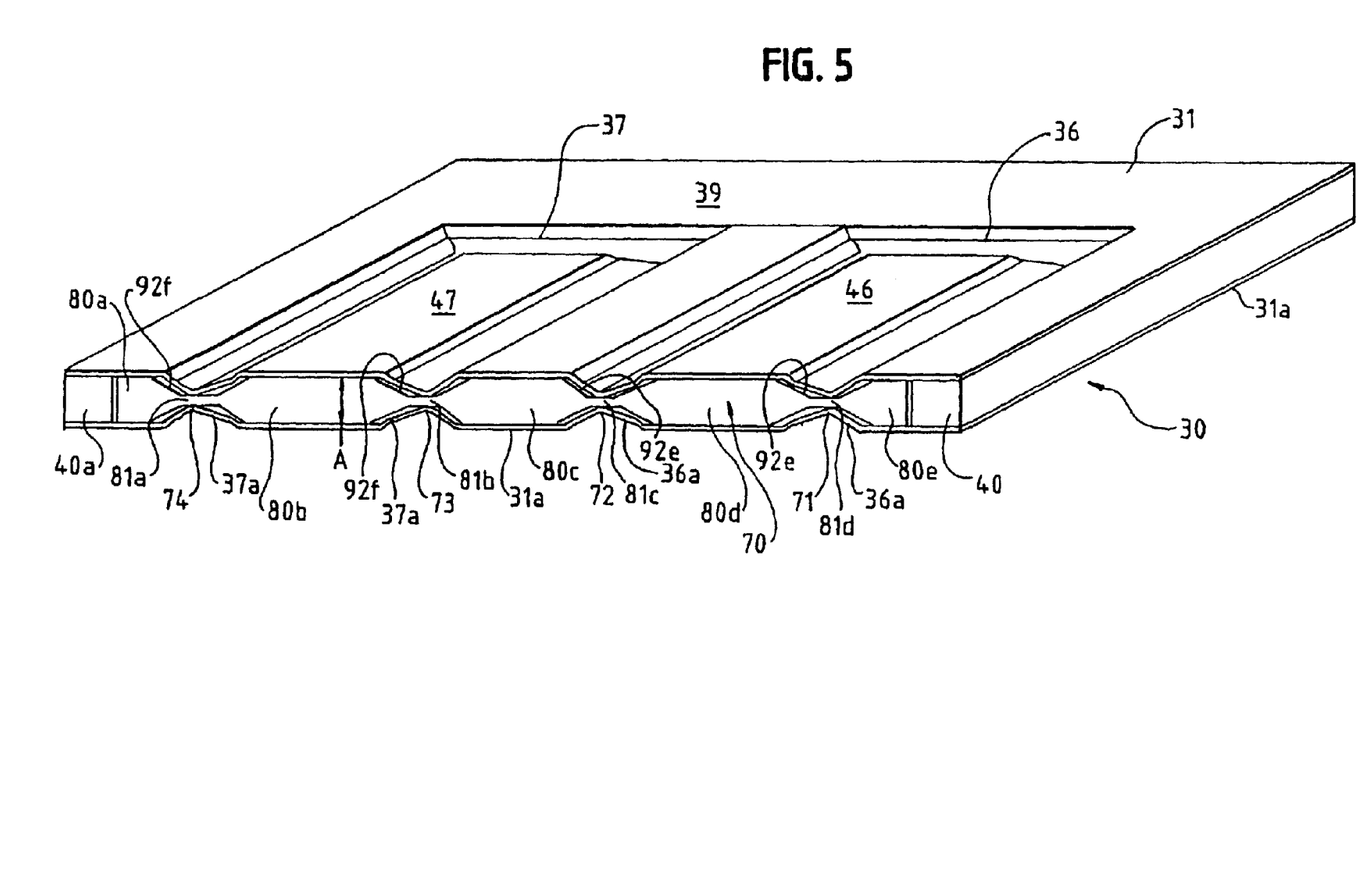
FIG. 5 is a cross-sectional view taken along line 4—4 of FIG. 2 of a paneled composite door, having perimeter framing and an alternative door core component in accordance with the methods and articles described herein.

FIG. 5 shows an alternative embodiment which provides a door having improved fire retardance. In this embodiment, the segments 80 and 81 intersect at an angle of less than ninety degrees, providing a core component that more closely fits the contours of the depressions 36, 37 of the doorskins 31 and 31a. The angle of intersection of the segments 80 and 81 is preferably in the range of about twenty to about ninety degrees, more preferably about thirty to about fifty degrees, and most preferably about forty degrees. The angle is variable, however, depending upon the shape of the depressions 36 and 37.

It has been found that this arrangement produces a door having improved fire retardance, particularly when the core component is made of a soft board material. For example, a one and one-half inch thick door having this arrangement can have a fire retardance rating of about twenty minutes, based on the aforementioned "Fire Endurance and Hose Stream Test" performed by Warnock Hersey. The door achieves such a rating without treatment with fire-retardant chemicals by slowing the ability of air to flow through the space defined by the doorskins 31, 31a, which in turn retards the ability of flames to burn through the door. The greater mass provided by such an arrangement may also help in providing such improved fire retardance.

Figure 6:
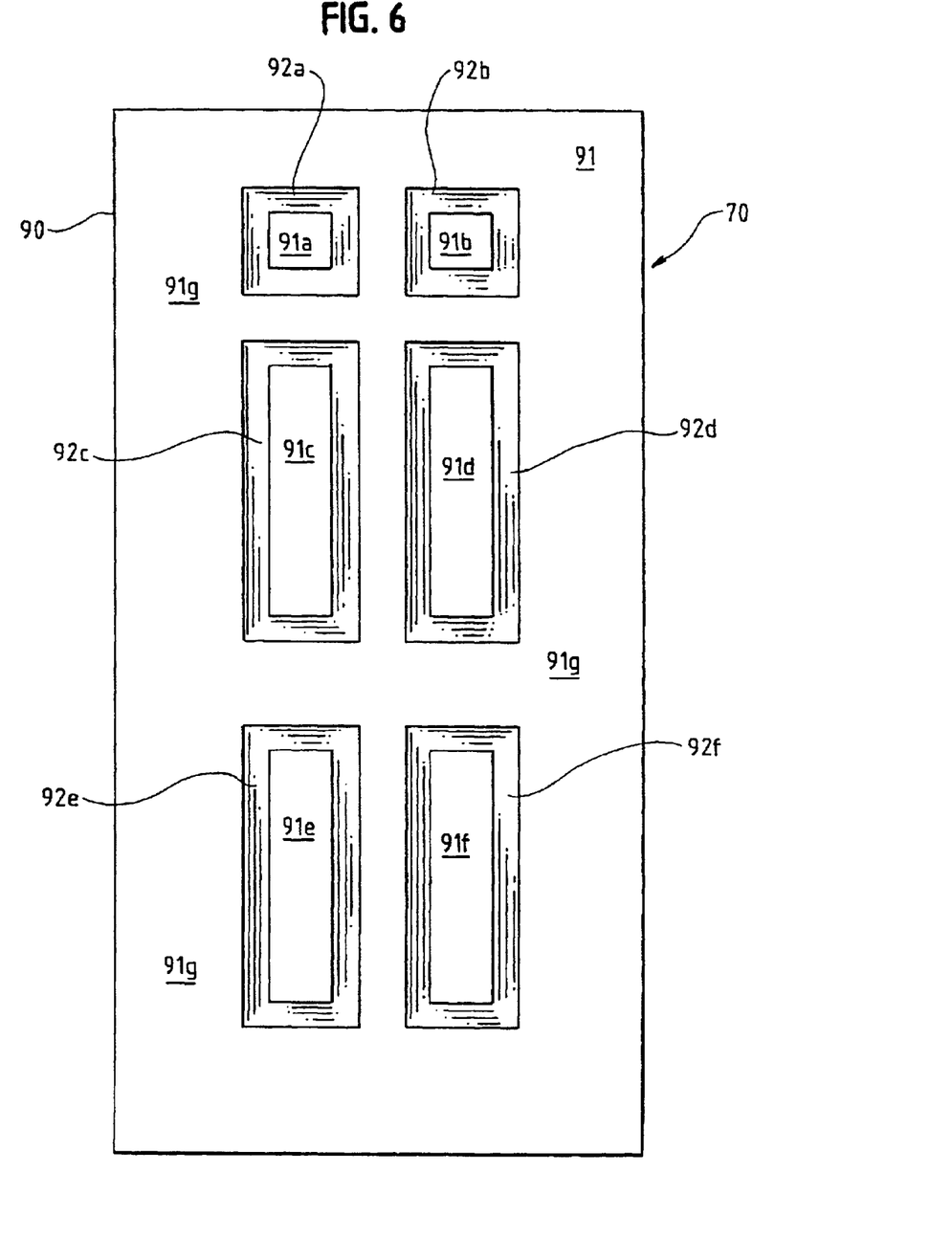
FIG. 6 is an elevated perspective view of a core component in accordance with the methods and articles described herein.

FIG. 6 illustrates another view of the core component 70. The core component 70 has an outer edge 90, and includes an upper, substantially planar major surface 91. The upper major surface 91 includes upper surface portions 91a, 91b, 91c, 91d, 91e, 91f, and 91g The upper surface portion 91g surrounds six relatively lower contoured portions or recesses 92a, 92b, 92c, 92d, 92e, and 92f. (The top surfaces of the recesses 92e and 92f define the top surfaces of the segments 81a, 81b, 81c, and 81d shown in FIG. 4.) The recesses 92a–92f in turn surround the aforementioned upper surface portions 91a–91f.

The core component 70 can be placed in the interior of a simulated six-panel hardboard doorskin because the recesses 92a–92f are located in the areas corresponding to the depressions outlining the panels in a six-panel door, for example the six-panel door of FIG. 2. Referring to FIGS. 4 and 5, for example, the void created by the doorskins 31 and 31a can be filled by a single core component 70 both at the constrictions 71–73 and the locations where the depth of the door 30 is greatest. The narrow segments 81a–81d (corresponding to the recesses 92a–92f of FIG. 6) are located at the constrictions 71–73, whereas the deeper segments 81a–81e (corresponding to the upper surface portions 91e, 91f, and 91g of FIG. 6) are located at the full-thickness locations of the door 30. The planar upper major surface 91 of the core component 70 is preferably attached to the bottom planar surface of the doorskin 31 by a suitable adhesive, as described below in greater detail.

Referring to FIG. 6, the core component generally has smooth and flat outer surfaces (e.g., the surface 91), surrounding the depressions 91a, 91b, 91c, 91d, 91e, and 91f. Optionally, the core component 70 can have a texture on the portions of its outer surface 91 which will come into contact with or be glued to the inner surface of the man-made composite doorskins 31 and 31a. In some cases, such a texture can help in the adhesion of the core component 70 to the doorskins. Further, it may in some cases be advantageous to provide a contoured exterior surface, for example, an outer surface 91g having a series of ribs protruding from the surface 91 and running along the length or width of the core component 70.

According to a preferred embodiment, in addition to the recesses or depressions 92a–92f being able to accommodate the depressions 32–37 of the six-panel door 30 of FIG. 2, the recesses 92 are at the same time able to accommodate the depressions of various other styles of paneled doors (for example, the depressions 12, 13 in the door 10 of FIG. 1).

Figure 7:
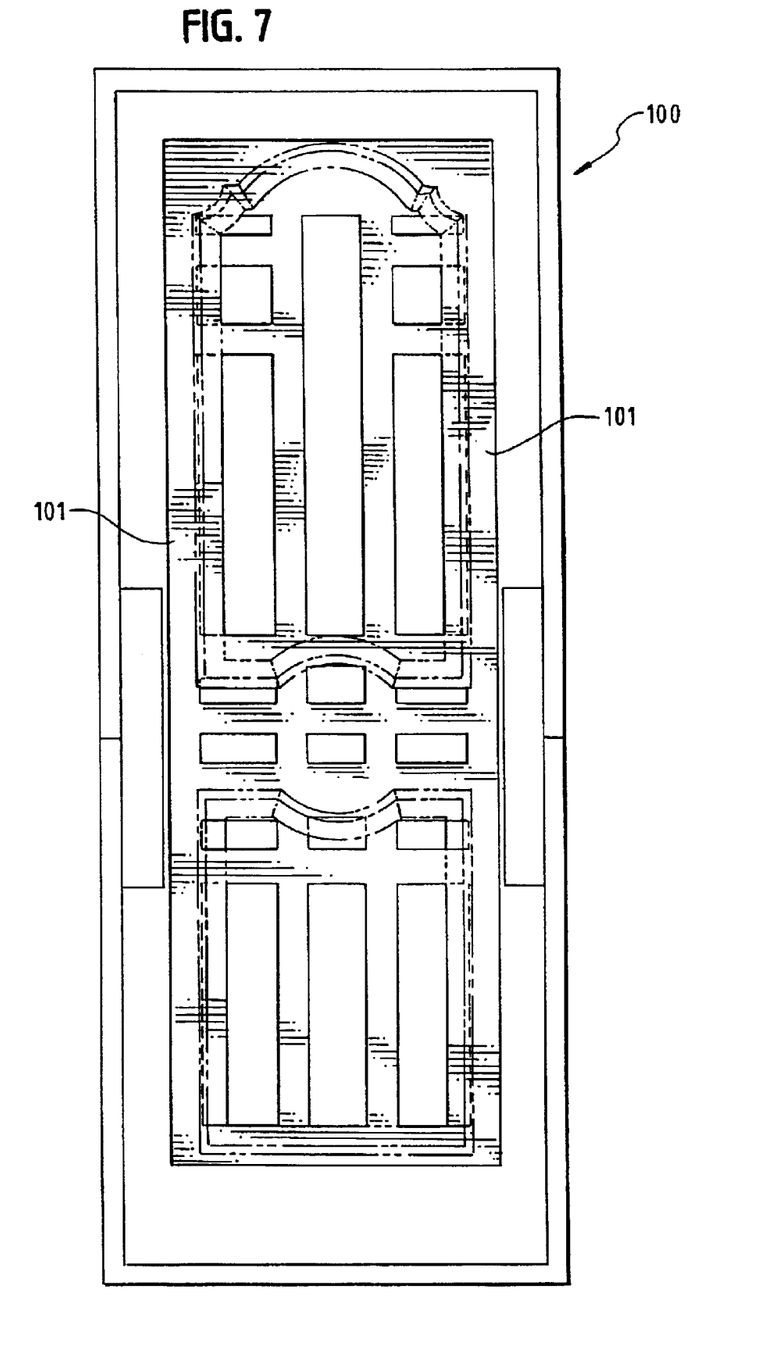
FIG. 7 is an elevated perspective view of a core component in accordance with the methods and articles described herein, wherein the component can be utilized with multiple styles of paneled doorskins.

With this feature, the core component can be utilized in conjunction with any doorskin that includes one or more depressions in locations where the deeper portions 80 are located. A single, integrated design of core component (a so-called "master" or "universal" core component) can then be utilized with multiple styles of paneled doorskins. The integration of designs can be accomplished by taking into account all of the desired styles of doors; whenever one style of door dictates a contour or depression, the master core component will be manufactured to have a recessed zone 92 at that location. FIG. 7 illustrates this feature of the invention wherein a single core component 100 can be used with numerous styles of molded doorskins, e.g., with either of the doors 10 and 30 shown in FIGS. 1 and 2. The core component 100 of FIG. 7 includes a recessed zone 101 that can accommodate the depressions found in numerous different styles of paneled doors, including, for example, the contoured depressions 12 and 13 in FIG. 1 and the depressions 32–37 in FIG. 2. This allows the door manufacturer to directly interchange the core component 100 for use with any desired style of molded doorskin, avoiding the need for the door manufacturer to stock an inventory of multiple versions of the wood blanks.

Figure 8:
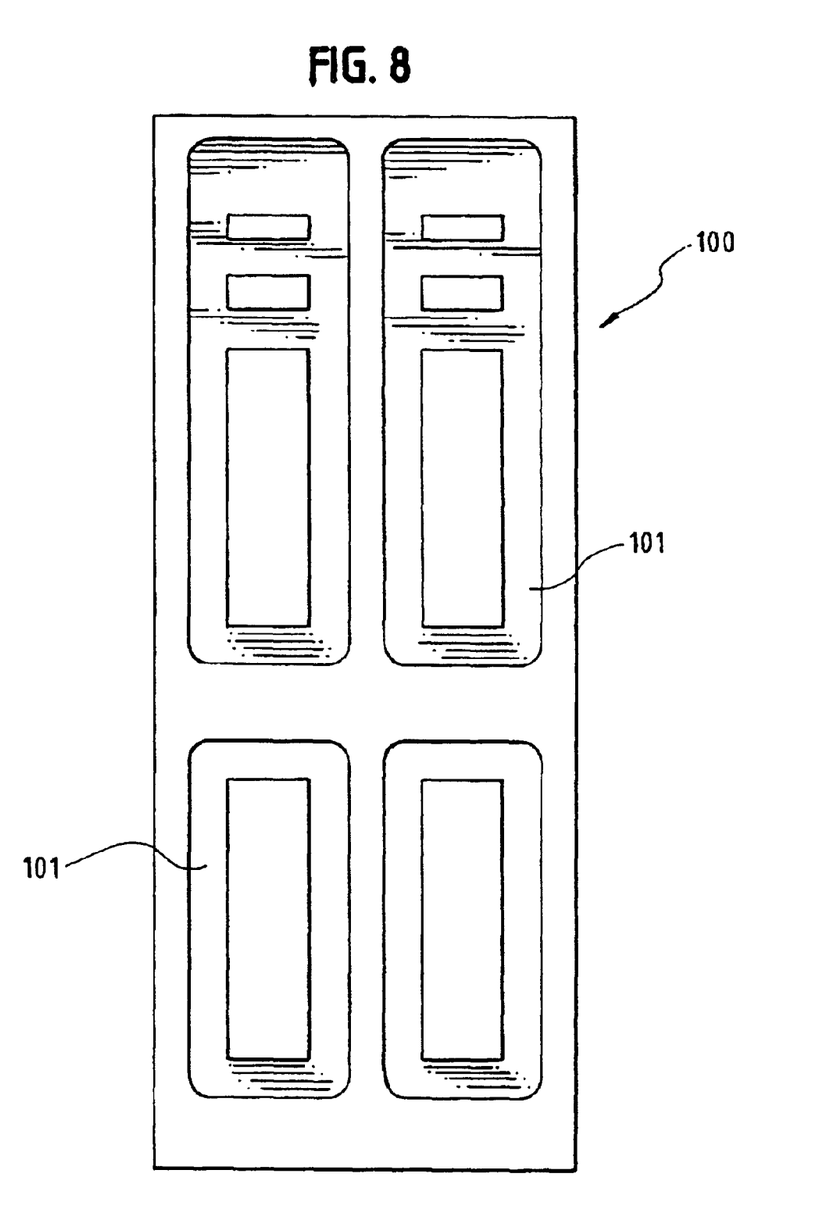
FIG. 8 is an elevated perspective view of an alternative embodiment of a core component in accordance with the methods and articles described herein, wherein the component can be utilized with multiple styles of paneled doorskins.

FIG. 8 illustrates a core component having an alternative pattern that can accommodate various different styles of simulated paneled doors (e.g., various four- and six-paneled doors). The patterns illustrated in FIGS. 7 and 8 allow for doorskins (e.g., doorskins 10 and 30) having depressions that are both straight (e.g., the depression 32 in FIG. 2) and curved (e.g., as in the depression portion 14 in FIG. 1).

Preferred methods of manufacturing a man-made hardboard door product with a core component from composite soft board are described below. It is understood, however, that, as described above, the core components can be used with building members other than composite doors. In addition, the core components can be used in conjunction with a doorskin or door face made of materials other than fiberboard. Further, the cellulosic material selected for the core component is variable, depending upon the intended use of the core component. Suitable types of fiberboard material include soft board, medium-density fiberboard, hardboard, and oriented strandboard, as well as the other materials described above.

An exemplative dry process useful for making the core components described herein begins by first providing a suitable cellulosic refined wood fibers having a moisture content of less than about 50 weight percent, based on the weight of dry cellulosic fibers, preferably less than about 20 weight percent based on the dry weight of the cellulosic fibers.

The refined cellulosic fiber is blended with a suitable thermosetting resin binder. Any of the dry processes known in the art can be used to blend the wood fiber with the binder resin, including blowline feeding of the wood fiber and binder resin, or other mechanical means. For example, the cellulosic fibers may be first coated with the thermosetting resin binder by blowline addition. Air turbulence causes the binder to disperse onto the fibers. The resin-coated fibers are randomly formed into a mat by air blowing the coated fibers onto a support member to form a mat. The fibers, either before or after formation of the mat, can optionally be subjected to an evaporation step that usually includes the application of heat, to cause a portion of the water in the fiber to evaporate.

The amount of binder resin used in the dry process to produce the mat is generally about 0.5 to less than 20 weight percent based on the weight of dry cellulosic fiber, but can vary depending upon the other process parameters and intended use of the final product. Wood fibers are contained in the core components in an amount of at least 80% by weight of the product, preferably at least about 85% by weight based on the dry weight of the core component. The binder resin is preferably used at about three to about fifteen weight percent, and more preferably about three to about ten weight percent, based upon the dry weight of the fibers. However, the amount is variable depending upon the other process parameters and the desired final product. Numerous useful binders for the manufacture of fiberboard are known in the art, and include various modified and unmodified phenol-formaldehyde, urea-formaldehyde, and/or isocyanate resins, including mixtures thereof. Examples of suitable binders are disclosed, for example, in Kirk-Othmer Encyclopedia of Chemical Technology, Vol. 15, pp. 176–208 (2nd Ed., 1970) and U.S. Pat. No. 5,367,040 to Teodorczyk, the disclosures of which are hereby incorporated by reference. Various modifiers can be added to the binder resin, as known in the art.

The dry process mats useful for producing the core components described herein are planar mats having at least about 80% refined, fibrillated cellulosic fibers, and preferably have an overall moisture content less than about 20%, more preferably about 2% to about 16% by weight, based upon the dry weight of the mat, prior to wetting the major surfaces of the mat.

In accordance with an important feature of the preferred process for manufacturing core components, each mat surface molded to include one or more depressions should have an average of at least 2% more moisture in the upper and lower 10% of the mat thickness than the average moisture content at the center of the thickness of the mat prior to hot pressing (molding) in order to achieve sufficiently strong major surfaces for adhesively adhering doorskins to said major surfaces.

The mats preferably have a moisture content of about 2% to about 16%, based on the dry weight of the mats, prior to increasing the surface moisture content in at least one major surface to, preferably, 4% to 20% greater than the average moisture content at the center of the thickness of the mat. In a preferred embodiment, the mat comprising refined wood fiber, binder resin and at least 2% moisture prior to surface wetting, can have a thickness of about 2 to about 6 inches, for example, after pre-pressing the mat to a density of about 3–6 pounds per cubic foot in making a "pre-form"; however, this thickness is widely variable depending upon the desired thickness of the consolidated product (core component), the type of cellulosic material being used, and pressing conditions, as well as other process parameters. The "preform" has sufficient structural integrity to be inserted into the press or mold cavity, along with a lower screen that the fiber and binder mixture is initially deposited on.

To make the preform, in accordance with a preferred embodiment, the fibers and binder resin are deposited onto a pervious support structure, such as a screen, at a basis weight in the range of about 0.9 lbs./ft$^2$ to about 3.0 lbs./ft$^2$, more preferably in the range of about 1 lb./ft² to about 2 lbs./ft², with a target of about 1.4 lbs./ft², in order to manufacture core components having a final density in the range of about 10 lbs./ft³ to about 30 lbs./ft³. The mat, as initially deposited on the support structure, may have a thickness up to about 12 to 15 inches and is pre-compressed (pre-pressed) in any manner known in the art to make the pre-form, such as by conveying the mat between opposed rollers, or opposed belts that are spaced progressively closer together down-line, to compress the mat to a thickness of about 6 inches or less, preferably about 2–6 inches, more preferably about 3–4 inches in thickness.

It is well known that fiberboards made by the dry process are not as strong as fiberboards made by the wet or wet/dry processes (other variables, such as resin content and press times being the same) since refined, fibrillated fibers that are water-slurried will result in substantially greater fiber entangling than occurs in the dry process. It has been found, therefore, that the core components described herein, when molded to include one or more interior, molded depressions, and when pressed at commercially acceptable press times, e.g., 2 to 30 minutes, preferably less than about 20 minutes, require an additional pre-press surface wetting treatment in order to increase the surface density to a value greater than the surface density achieved in normal dry-process fiberboard production.

Core materials made by existing dry-process fiberboard production processes do not have sufficient surface strength so that a typical 3 foot by 7 foot core component produced by existing dry processes when fed into a glue spreader—an apparatus that rolls glue over the planar surface area surrounding the interior depressions—will peel over at least a portion of the planar surfaces being coated with adhesive.

It has been found that there are two primary reasons for surface peeling of dry process core components during the above-described post-press glue application step: (1) heat transfer into the dry process mat during consolidation into a core component is inadequate since little to no water is available to more efficiently transfer heat throughout the mat; and (2) due to the inefficient heat transfer to the center of the mat, a surface portion of the mat becomes hot enough to cure the resin at the surface of the core component before the mat is compressed to its final thickness, resulting in a surface layer that does not bond sufficiently to the underlying fibers.

In order to overcome the above-mentioned surface peeling problems, applicants have found that by adding water to at least one major surface of the dry-process formed mat prior to pressing, so that surface layer(s) (a wetted surface 10% of the thickness of the mat when inserted into the mold cavity) have an average of at least 2% by weight more moisture than an average moisture content at the center of the thickness of the mat, for example, 2% to about 32% more moisture in the surface layer(s) than in the center of the mat thickness, preferably at least 4% by weight more moisture, more preferably 4–30% by weight more moisture in the surface layers, most preferably about 12–18% more moisture in the surface layer(s), based on the dry weight of the mat, with the mat to be pressed having, prior to surface wetting, a preferred moisture content of 2–16% by weight, based on the dry weight of the mat.

The additional surface water lengthens the time it takes for the surface resin to cure during the press cycle, so that the mat is compressed to its final dimensions before the thermosetting resin, including the surface resin, is completely cured, thereby creating a strong, relatively uniform bond throughout the thickness of the core component. By this "pre-press" water addition to at least one major surface of the mat, the pre-press wetted surface layer of the core component does not peel away from the core component during adhesive application to the planar stile and rail portions of the core component, and the post-press core component has added surface strength and density for any core-contacting post-press surface treatment, particularly an adhesive coating step. Optionally, a surfactant or penetration aid can be added to the water applied to the core component surfaces for better, more uniform distribution of the water into the upper and/or lower major surfaces of the mat. Suitable surfactants or penetration aids, preferably also containing a mold release agent for easier removal of the core components from the mold cavity, applied in an amount of about 1–10% by weight of the surface-applied water, preferably about 3–7%, more preferably about 2–5% by weight, and most preferably about 2.5% by weight of the applied surface water, include Wurtz PAT-529/S; SUR-FYNOL® 104H surfactant (75% by weight tetramethyl-5-decyne-4,7-diol and 25% by weight ethylene glycol); TRITON X-100 surfactant (97% by weight octylphenoxypolyethoxy-ethanol and 3% polyethylene glycol); and RHODASURF DA-639 (polyoxyethyoxylated (6) isodecyl alcohol); Akzo Nobel Coatings, Inc. Product No. 819-C029-4 clear post-press sealer; and the like.

The additional surface water can be applied in any suitable manner such as spraying, via steam surface contact, or any known coating technique.

The pre-form is surface wetted on at least one major surface, preferably both major surfaces, prior to placing the pre-form into the mold cavity such that the wetted major surface layer(s) have an average moisture content at least 2% greater than the average moisture content of the mat at a center of its thickness, preferably 4–30% more moisture, on average, in the surface layer(s) than the average moisture content of the pre-form along a plane of the pre-form at the center of its thickness (hereinafter called the "thickness center"). The surface layer or layers are hereby defined as an outer thickness of a wetted major surface extending into the mat, from the wetted major surface of the pre-form, a depth of 10% of the pre-form thickness.

The water applied to one or both major surfaces of the pre-form is applied in an amount sufficient to achieve the increased moisture content of at least 2% more in the surface layer(s) than at the thickness center, preferably about 4% to about 30% more moisture, more preferably about 8% to about 20% more moisture in the wetted surface layer(s). The water applied to one or both major surfaces of the pre-form, or during pre-pressing in making the pre-form, should penetrate less than 20% of the depth of the pre-form measured into the pre-form from the wetted surface, preferably 10–15% depth penetration. Small amounts of water, e.g., less than 20% by weight, can penetrate more deeply so long as the surface 10% of the thickness of the pre-form has an average of at least 2% by weight more moisture than the average moisture content at the thickness center. Generally, water is applied in an amount of about 5 to 20 grams/ft² of surface area, preferably about 7 to 15 grams/ft², more preferably about 10 grams/ft² over both major surfaces. Higher moisture contents in the surface layers provides a stronger, denser surface to the core components and increases the compressibility of the mat in the press or mold cavity used to form the core component as a non-laminated, unitary structure, having one or more depressions in one, or preferably both major surfaces. It is most preferred that the pre-form have an average moisture content at the center thickness of about 5–8% by weight, based on the dry weight of the pre-form, with an average moisture content in the upper and lower 10% of the pre-form thickness (in the wetted surface layers) of about 8% to about 20% by weight moisture, with a target surface layer moisture content of about 12–18% moisture, particularly about 15% moisture, based on the dry weight of the pre-form.

In accordance with one important embodiment, the lower surface layer of the pre-form (at the screen-contacting major surface) is wetted by contacting the lower surface of the mat with steam at a sufficiently low pressure that the steam is condensed on the mat fibers only about 10–20% of the depth of the pre-form, and is applied to the lower surface of the mat during the pre-press process (while the pre-form is being made) or upon completion of the pre-form, and prior to placing the pre-form into the mold cavity. Since the pre-compression of the mat is performed while the lower surface of the mat is being carried by a water-pervious screen, steam is easily passed through the screen across the entire width of the lower surface as the mat is being compressed in a continuous process line used to make the pre-form.

The undersurface of the mat has been found to dry at a faster rate than the upper surface of the mat during loading of a plurality of mats into a multi-panel hot press, since the undersurface of the mats, particularly mats first loaded, are in contact with a lower mold surface still hot from a previous pressing prior to closing the press to contact the upper surface with the hot, upper, contoured mold die. In order to maintain a higher moisture content on the lower mat surfaces similar to the moisture content on the upper mat surfaces prior to closing the mold cavity, therefore, the loss of moisture on the lower mat surface prior to pressing can be compensated for by applying more water to the lower surface of the mats than on the upper surface; or by a short steam surface contact time at a small enough steam pressure to prevent steam from penetrating more deeply into the lower major surface more than about 20% of the thickness of the mat; and/or by increasing the surface density and surface strength of the lower surface of the consolidated core components in a post-press step, such as a surface treatment capable of increasing the strength of the lower surface of the consolidated core component, e.g., coating the lower core component surface with a sealer, such as polyvinyl acetate, e.g., Akzo Coatings Product No. 610-C020-264. The sealer is preferably applied to a lower surface of the core component in an amount of active sealer of about 1–10 grams/ft$^2$ of lower core component surface area, more preferably about 2 to about 6 grams of active sealer per square foot of surface area, most preferably about 4 grams of polyvinyl acetate per square foot of the lower major surface of the core component. Suitable post press sealers are well known in the art and include, for example: Akzo Nobel Coatings, Inc. acrylic, sealers, Product Nos. 610-C020-178 and 610-C020-179; Akzo Nobel Coatings, Inc. clear post-press sealer, Product No. 819-C029-4; and the like.

It has been found that the surface water addition slows the cure of the resin at the heated surface of the mat sufficiently to prevent surface layer peeling of the finished core component during a core-component post-press surface treatment step, particularly adhesive application, without detrimentally slowing the overall press time needed to manufacture the core components described herein. Ideally, even after the above-described surface water addition, the core components can be completely consolidated in the heated press, with complete cure of the binder resin, at overall press times of about 30 minutes or less, preferably about 10 minutes or less, more preferably about 2 to 6 minutes, usually in about 4 minutes.

Examples of resins having suitable gel times capable of eliminating the above-described, undesirable "precure" (premature surface resin curing) while having essentially complete thermosetting resin curing throughout the core component, for overall core component strength, in a sufficiently short press time for commercial manufacture, are identified below. The following exemplary resins that have cure rates of slow, medium, and fast provide the indicated core component properties:

SLOW PHENOLIC RESIN, e.g., GEORGIA PACIFIC 99C28

Gel time—57 minutes

Slow resin gives less precure, better surfaces. Pre-press water surface treatment is less critical. Slow cure gives lower overall strength at the same press time, press time would likely be lengthened to 7–15 minutes. Used when surface strength needs to be improved for a particular application.

MEDIUM PHENOLIC RESIN, e.g., GEORGIA PACIFIC 169C21

Gel time—29 minutes

Preferred embodiment: Good surfaces in combination with pre-press water surface treatment and good strength at currently planned four minute cycle.

FAST PHENOLIC RESIN, e.g., GEORGIA PACIFIC 106C77

Gel time—20 minutes

Fast resin gives good overall strength while allowing shortest cycles. Fast resin gives poorest surfaces. Pre- and post-press surface treatments essential to adequate surface strength.

Once placed in the press, the mats are molded under heat and pressure. The press temperature is preferably in the range of about 275° F. to about 550° F. (and more preferably about 390° F. to about 450° F.), and the press pressure is preferably in the range of about 400 psi to about 850 psi (more preferably 600 psi to about 800 psi). The press time is generally in the range of about 20 seconds to about 30 minutes (more preferably in the range of about 1 minute to about 10 minutes, most preferably about 2 minutes to about 6 minutes). However, these conditions are variable depending upon the desired final product and that those of ordinary skill in the art will be able to make modifications based upon the desired final product. When exposed to this heat and pressure, the thermosetting resin will be cured and the mat will be compressed into an integral consolidated structure. The overall density of the soft board core component is preferably in the range of about 10 lbs/ft$^3$ to about 30 lbs/ft$^3$ (more preferably about 12 to about 25 lbs/ft$^3$, and most preferably about 13 to about 18 lbs/ft$^3$). The density of the pressed soft board (core components) vary significantly between the areas that include molded depressions and the planar areas surrounding the depressions. The density in both locations depend upon the basis weight of the mat being pressed, the desired ultimate thickness of the core components, and the depth of the depressions. However, in a single core component, the variation of density at different depressions, and the variation of density at different planar areas surrounding the depressions should be minimal. The overall specific gravity of such an article can be in the range of about 0.2 to about 0.6, preferably about 0.2 to about 0.5, and most preferably about 0.2 to about 0.3, with the specific gravity at the depressions being as high as about 1.2, and the specific gravity at the thicker, planar areas being generally about 0.2 to 0.5.

According to a preferred method, a dry process pre-form mat having a thickness of about 2 to 6 inches is pressed to final dimensions, e.g., 1⅜ or 1½ inches in thickness, in a single hot pressing operation, while forming doorskin depression-receiving recesses in one or both major surfaces. In accordance with another, less-preferred embodiment, a plurality of soft board "blanks" are pressed from cellulosic mats, and a pressed soft board blank can be combined with (e.g., laminated to) additional prepressed blanks to achieve a desired thickness. The softboard laminated wood blanks are preferably manufactured to a thickness of about ⅜ inch each. The blanks can be laminated together to form any desired final thickness, preferably in the range of about ¾ inch to about 3 inches, and more preferably about 1 inch to about 1¾ inches, e.g., about 1⅛ inches or about 1½ inches. Any suitable adhesive, such as casein or polyvinylacetate, can be used to bond the laminates together.

A pattern doorskin depression-receiving recess, or depressions, such as described above, is molded to a depth of about ½ inch into the soft board core component on each of the major surfaces of the core component during consolidation, to have the configuration shown in FIG. 6 or FIG. 7, for example. The distance between the molded depressions on opposite sides of the core component preferably is in the range of about one-eighth to about one-half inch.

The recessed depressions molded into the surfaces of the core components can have a bead or bead-and-cove design, e.g., as can be provided with the zones 12 and 13 of the doorskin 11 of FIG. 1. This molded depressing can be utilized in conjunction with the above-described method for providing a "master" core component that can be used with multiple styles of doorskins.

Once the core component has been produced, it preferably will be assembled along with two doorskins and framing structure as described above. Although any type of doorskin can be utilized in accordance with the inventive method and article, conventional hardboard doorskins having a thickness of about one-eighth inch are preferred.

Many different sizes of core components can be produced in accordance with the invention. For example, a core component having a thickness of about one and one-eighth inch can be placed on the interior of a doorskin assembly having an external thickness of about 1⅜ inches. Such a door is preferably used for interior home applications. A core component having a thickness of about one and one-half inch can be placed on the interior of a doorskin assembly having an exterior thickness of about 1¾ inches. Such a door provides greater mass and protection, and can be used as an interior door or an exterior door, and for various commercial and industrial door applications.

Preferred adhesives for bonding the core components to doorskins include, for example, casein or polyvinylacetate, and their derivatives. The adhesive is preferably placed at all locations where the doorskins and/or the framing members come into contact with the core component 70, e.g., at all planar surfaces surrounding the depressions. The inventive door preferably uses a rail and stile supporting structure. However, it is contemplated that the need for a lock block might be avoided through the use of the inventive process.

As described above, the inventive core component preferably provides a door product or other building member, with beneficial weight and sound insulation properties that is not as time-consuming or labor intensive to manufacture as known core components. The core component also can provide substantial structural stability. A door comprising fiberboard doorskins and the inventive core component will preferably have the same feel and ability to swing shut (e.g., as a result of a desirable weight) as a natural wood door. Further, the sound insulation and fire retardance properties of the door are preferably greatly improved over the properties of a similar door which lacks the inventive core component.

The foregoing description is given for clearness of understanding only, and no unnecessary limitations should be understood therefrom, as modifications within the scope of the invention will be apparent to those skilled in the art.

What is claimed is:

1. In a method for the preparation of a consolidated wood fiber article useful as a core component for a structural member, comprising the steps of:
   (a) combining refined wood fibers and a binder resin and compressing the fibers and binder resin together sufficiently to form a pre-form mat having opposed major surfaces and having sufficient structural integrity to place the pre-form into a mold cavity;
   (b) placing the pre-form from step (a) into a mold cavity shaped to form at least one interior depression into at least one major surface of the pre-form;
   (c) compressing the pre-form in said cavity under elevated temperature to cure said binder resin and consolidate said cellulosic material into a structurally sound core component, wherein at least one of said major surfaces includes at least one interior depression formed in the mold cavity, said depression projecting inwardly from said major surface; and
   (d) removing said core component from said mold cavity;
the improvement comprising: providing, before step (c), added moisture in at least a surface layer of the pre-form that is molded to include said depression, such that the pre-form placed in the mold cavity contains at least 2% by weight more moisture in a depression-receiving surface layer than at a center of the thickness of the pre-form, based on the dry weight of the pre-form, said surface layer defined as the surface 10% of the thickness of the pre-form.

2. The method of claim 1, wherein:
the core component has a density in the range of about 10 lbs./ft$^3$ to about 30 lbs./ft$^3$.

3. The method of claim 1, wherein the depression in said major surface comprises:
   (i) a first, inclined depression wall having an upper surface integral with, and extending downwardly from, said major plane;
   (ii) a depression bottom wall having an upper surface integral with, and extending from, said upper surface of said first inclined wall; and
   (iii) a second, inclined depression wall having an upper surface integral with, and extending from, both of (A) said depression bottom wall surface and (B) said major plane.

4. The method of claim 1, wherein both major surfaces include at least one depression.

5. The method of claim 4, wherein both major surfaces include a surface layer containing added moisture in an amount in the range of 2% to about 32% more moisture, on average, in the surface layers than an average moisture content at the center of the thickness of the pre-form when the pre-form is placed in the mold cavity.

6. The method of claim 5, wherein each surface layer contains an average moisture content that is 4% to 32% by weight greater than the average moisture content at a center of the thickness of the pre-form, when placed in the mold cavity.

7. The method of claim 6, wherein each surface layer contains an average moisture content that is 8% to 20% by weight greater than the average moisture content at a center of the thickness of the pre-form, when placed in the mold cavity.

8. The method of claim 7, wherein each surface layer contains an average moisture content that is 12% to 18% by weight greater than the average moisture content at a center of the thickness of the pre-form, when placed in the mold cavity.

9. The method of claim 6, wherein the average moisture content at the center of the thickness of the pre-form, when the pre-form is placed in the mold cavity, is in the range of 2% to 16%, based on the dry weight of the pre-form.

10. The method of claim 7, wherein the average moisture content at the center of the thickness of the pre-form, when the pre-form is placed in the mold cavity, is in the range of 5% to 8%, based on the dry weight of the pre-form.

11. A method for the preparation of a consolidated cellulosic article useful as a core component for a structural member defining an internal void having a depth varying at two or more locations thereof, comprising the steps of:
   (a) combining refined wood fibers and a binder resin and compressing the fibers and binder resin together sufficiently to form a pre-form mat having opposed major surfaces and having sufficient structural integrity to place the pre-form into a mold cavity;
   (b) surface wetting both major surfaces of said pre-form such that a surface layer of each major surface contains at least 2% more moisture than the pre-form at a mid-pont between said opposed major surfaces;
   (c) placing the surface-wetted pre-form of step (b) into a mold cavity shaped to form at least one interior depression in each of said major surfaces of said pre-form;
   (d) molding the pre-form in said mold cavity under elevated temperature to cure said binder resin and consolidate said refined wood fibers into a structurally sound core component having a shape which corresponds to the shape of said mold cavity; and
   wherein the pre-form is molded to form a core component having:
      (i) two major exterior surfaces defining respective front and rear sides of said core component, and wherein the rear side of the component is the mirror image of the front side; and
      (ii) at least one depression in each major surface projecting inwardly therefrom;
   wherein said core component is a solid, integral structure formed from molded mat material containing at least 80% by weight refined wood fiber, based on the total dry weight of the core component, and said depressions are located in a predetermined arrangement to accommodate each of said variations in depth of said structural member.

12. The method of claim 11, wherein:
   the resin binder is included in the pre-form mat in an amount of about 1% to about 15%, based on the total dry weight of the mat.

13. The method of claim 11, wherein both major surfaces include at least one depression.

14. The method of claim 13, wherein both major surfaces include a surface layer containing added moisture in an amount in the range of 2% to 32% more moisture, on average, in the surface layers, than an average moisture content at the center of the thickness of the pre-form when the pre-form is placed in the mold cavity.

15. The method of claim 14, wherein each surface layer contains an average moisture content that is 4% to 32% by weight greater than the average moisture content at a center of the thickness of the pre-form, when placed in the mold cavity.

16. The method of claim 15, wherein each surface layer contains an average moisture content that is 8% to 20% by weight greater than the average moisture content at a center of the thickness of the pre-form, when placed in the mold cavity.

17. The method of claim 16, wherein each surface layer contains an average moisture content that is 12% to 18% by weight greater than the average moisture content at a center of the thickness of the pre-form, when placed in the mold cavity.

18. The method of claim 15, wherein the average moisture content at the center of the thickness of the pre-form, when the pre-form is placed in the mold cavity, is in the range of 2% to 16%, based on the dry weight of the pre-form.

19. The method of claim 16, wherein the average moisture content at the center of the thickness of the pre-form, when the pre-form is placed in the mold cavity, is in the range of 5% to 8%, based on the dry weight of the pre-form.

20. A method for the preparation of a composite cellulosic article useful as a core component for a structural member, comprising the steps of:
   (a) combining cellulosic fibers and a binder resin to form a mat having a moisture content of 2–16% by weight, based on the dry weight of the mat, said mat having two opposed major surfaces;
   (b) surface wetting both major surfaces of said mat from step (a) such that a surface layer having a depth of 10% of the total mat thickness, at each major surface, contains at least 2% more moisture than the mat at a mid-pont between said opposed major surfaces;
   (c) subjecting said surface-wetted mat to elevated temperature and pressure to cure said binder resin and form said mat into a structurally sound core component while providing at least one interior depression in each of said major surfaces, said depressions projecting inwardly from said opposed major surfaces, such that the rear side of the core component is the mirror image of the front side.

21. The method of claim 20, wherein each wetted surface layer has an average moisture content of about 4% to about 20% more than an average moisture content at a center of the thickness of the mat when placed in the mold cavity.

22. The method of claim 20, wherein:
   said core component has a density in the range of about 10 lbs./ft$^3$ to about 30 lbs./ft$^3$.

23. The method of claim 20, wherein the depressions in said core component comprise:
   (i) a first, inclined depression wall having an upper surface integral with, and extending downwardly from, said major plane;
   (ii) a depression bottom wall having an upper surface integral with, and extending from, said upper surface of said first inclined wall; and
   (iii) a second, inclined depression wall having an upper surface integral with, and extending from, both of (A) said depression bottom wall surface and (B) said major plane.

24. A method for the preparation of a composite cellulosic article useful as a core component for a structural member defining an internal void having a depth varying at two or more locations thereof, comprising the steps of:
   (a) combining cellulosic fibers having at least 2% by weight moisture, based on the dry weight of the cellulosic fibers, and a binder resin to form a wet mat having two opposed major surfaces;

(b) surface wetting both major surfaces of said wet mat such that surface layers, defined as the upper 10% of the mat thickness and the lower 10% of the mat thickness, contain an average of at least 2% more moisture than the average moisture content of the wet mat at a mid-pont between said opposed major surfaces;

(c) subjecting said surface-wetted mat from step (b) to elevated temperature and pressure to cure said binder resin and form said mat into a structurally sound core component while providing at least one interior depression in each of said major surfaces, said depressions projecting inwardly from said opposed major surfaces, such that a rear side of the core component is the mirror image of a front side; and (d) molding said wet mat from step (c) to include:
(i) two major exterior surfaces defining respective front and rear sides of said core component, and wherein the rear side of the component is the mirror image of the front side; and
(ii) at least one depression in each major surface projecting inwardly therefrom;

wherein said core component is a solid, integral structure formed from molded mat material containing at least 80% by weight refined cellulosic fiber, based on the total weight of the core component, and said depressions are located in a predetermined arrangement to accommodate each of said variations in depth of said structural member.

25. The method of claim 24, wherein:
said cellulosic fibers comprise fibrillated cellulosic fibers and said core component has a density in the range of about 10 lbs./ft$^3$ to about 30 lbs./ft$^3$.

26. The method of claim 24, wherein both major surfaces include a surface layer containing added moisture in an amount in the range of 2% to 32% more moisture, on average, in the surface layers, than an average moisture content at the center of the thickness of the mat when the mat is placed in the mold cavity.

27. The method of claim 26, wherein each surface layer contains an average moisture content that is 4% to 32% by weight greater than the average moisture content at a center of the thickness of the mat, when placed in the mold cavity.

28. The method of claim 27, wherein each surface layer contains an average moisture content that is 8% to 20% by weight greater than the average moisture content at a center of the thickness of the mat, when placed in the mold cavity.

29. The method of claim 28, wherein each surface layer contains an average moisture content that is 12% to 18% by weight greater than the average moisture content at a center of the thickness of the mat, when placed in the mold cavity.

30. The method of claim 27, wherein the average moisture content at the center of the thickness of the mat, when the mat is placed in the mold cavity, is in the range of 2% to 16%, based on the dry weight of the mat.

31. The method of claim 28, wherein the average moisture content at the center of the thickness of the mat, when the mat is placed in the mold cavity, is in the range of 5% to 8%, based on the dry weight of the mat.

32. A method for the preparation of a composite cellulosic article useful as a core component for a structural member defining an internal void having a depth varying at two or more locations thereof, comprising the steps of:

(a) combining cellulosic fibers having at least 2% by weight moisture, based on the dry weight of the cellulosic fibers, and a binder resin to form a wet mat having two opposed major surfaces;

(b) surface wetting an upper major surfaces of said wet mat such that a surface layer, defined as the upper 10% of the mat thickness, contains an average of at least 2% more moisture than the average moisture content of the wet mat at a mid-pont between said opposed major surfaces;

(c) subjecting said upper surface-wetted mat from step (b) to elevated temperature and pressure to cure said binder resin and form said mat into a structurally sound core component while providing at least one interior depression in each of said major surfaces, said depressions projecting inwardly from said opposed major surfaces, such that a rear side of the core component is the mirror image of a front side;

(d) molding said wet mat from step (c) to include:
(i) two major exterior surfaces defining respective front and rear sides of said core component, and wherein the rear side of the component is the mirror image of the front side; and
(ii) at least one depression in each major surface projecting inwardly therefrom; and (e) applying a post-press sealer to the lower major surface of said core component in the amount of about 1–10 lbs./ft$^2$ to strengthen the lower surface of the core component;

wherein said core component is a solid, integral structure formed from molded mat material containing at least 80% by weight refined cellulosic fiber, based on the total weight of the core component, and said depressions are located in a predetermined arrangement to accommodate each of said variations in depth of said structural member.

* * * * *